United States Patent
Okuzono

(10) Patent No.: US 9,325,172 B2
(45) Date of Patent: Apr. 26, 2016

(54) POWER SUPPLY CONTROL APPARATUS AND METHOD FOR CONTROLLING THE SAME

(71) Applicant: CANON KABUSHIKI KAISHA, Tokyo (JP)

(72) Inventor: Ryotaro Okuzono, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 722 days.

(21) Appl. No.: 13/681,228

(22) Filed: Nov. 19, 2012

(65) Prior Publication Data

US 2013/0207484 A1     Aug. 15, 2013

(30) Foreign Application Priority Data

Feb. 15, 2012   (JP) ................................. 2012-031041

(51) Int. Cl.
    *H02J 3/00*       (2006.01)
    *G03G 15/00*     (2006.01)
    *G06F 1/32*       (2006.01)

(52) U.S. Cl.
    CPC ............ *H02J 3/005* (2013.01); *G03G 15/5004* (2013.01); *G06F 1/3209* (2013.01); *G06F 1/324* (2013.01); *G06F 1/3296* (2013.01); *Y02B 60/1217* (2013.01); *Y10T 307/76* (2015.04)

(58) Field of Classification Search
    CPC ... H02J 3/005; G03G 15/5004; G06F 1/3209; G06F 1/324; G06F 1/3296
    See application file for complete search history.

(56) References Cited

U.S. PATENT DOCUMENTS

| | | | | |
|---|---|---|---|---|
| 5,371,693 | A * | 12/1994 | Nakazoe | 713/321 |
| 5,412,761 | A * | 5/1995 | Teradaira | 358/1.12 |
| 5,420,783 | A * | 5/1995 | Gross | 323/268 |
| 8,351,813 | B2 | 1/2013 | Hashimoto | |
| 8,689,030 | B2 * | 4/2014 | Higuma et al. | 713/324 |
| 8,769,324 | B2 * | 7/2014 | Narushima et al. | 713/323 |

FOREIGN PATENT DOCUMENTS

JP     2009-015649 A     1/2009

\* cited by examiner

*Primary Examiner* — Zeev V Kitov
(74) *Attorney, Agent, or Firm* — Fitzpatrick, Cella, Harper & Scinto

(57) ABSTRACT

A power supply control apparatus comprises a receiving unit configured to receive data sent from an external device via a network, a control unit configured to process the data received by the receiving unit, a switching unit configured to switch between supply and disconnection of power from a first power supply unit to the receiving unit and to the control unit, and a mechanical switch configured to switch between supply and disconnection of power from a second power supply unit to the control unit. If the apparatus receives data from the external device in a power state in which power is supplied from the first power supply unit to the receiving unit and power to the control unit is stopped, the apparatus controls to supply power from the first power supply unit to the control unit without turning on the mechanical switch.

10 Claims, 7 Drawing Sheets

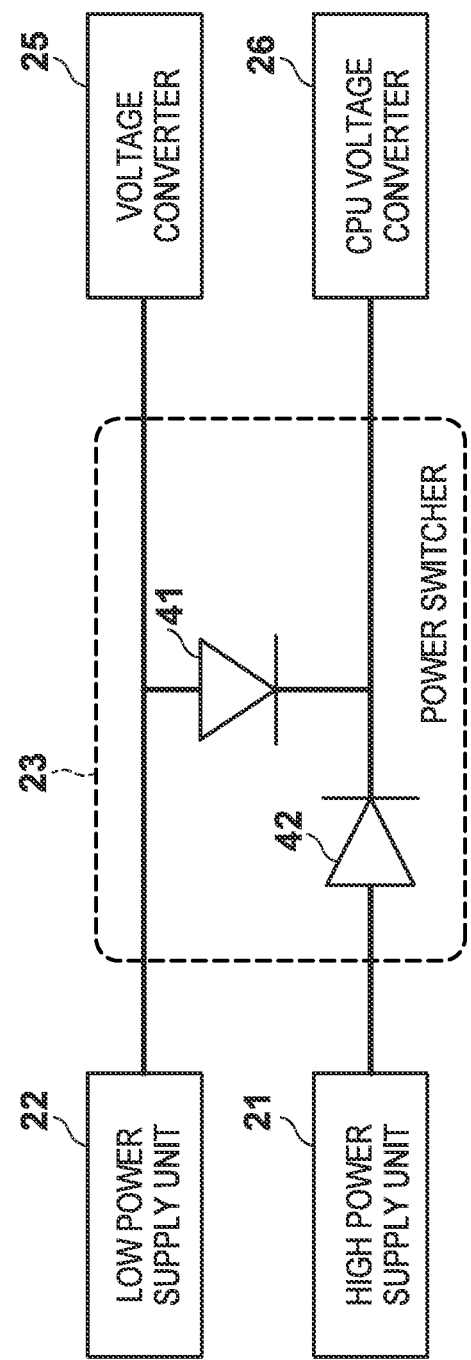

F I G. 4

| STATE | HIGH POWER SUPPLY UNIT | MECHANICAL RELAY | COMMERCIAL POWER SUPPLY | VOLTAGE CONVERTER | POWER SUPPLY CONTROLLER | NETWORK PROCESSOR | CPU VOLTAGE CONVERTER | CPU |
|---|---|---|---|---|---|---|---|---|
| POWER SAVING MODE | OFF | OFF | CONNECTED TO LOW POWER SUPPLY UNIT | ON | ON | ON | OFF | OFF |
| NETWORK RESPONSE MODE | OFF | OFF | CONNECTED TO LOW POWER SUPPLY UNIT | ON | ON | ON | ON | LOW POWER CONSUMPTION MODE |
| NORMAL MODE | ON | ON | CONNECTED TO BOTH LOW AND HIGH POWER SUPPLY UNITS | ON | ON | ON | ON | NORMAL MODE |

FIG. 7

| STATE | CPU | NETWORK PROCESSOR | POWER SUPPLY CONTROLLER | LOW POWER SUPPLY UNIT TOTAL | LOW POWER SUPPLY UNIT RATED OUTPUT |
|---|---|---|---|---|---|
| POWER SAVING MODE | 0W | 0.7W | 0.1W | 0.8W | 8W |
| NETWORK RESPONSE MODE | 5W | 0.7W | 0.1W | 5.8W | 8W |
| NORMAL MODE | 10W | 0.7W | 0.1W | 0.8W | 8W |

POWER SUPPLY CONTROL APPARATUS AND METHOD FOR CONTROLLING THE SAME

BACKGROUND OF THE INVENTION

1. Field of the Invention

The present invention relates to a power supply control apparatus, having a power saving mode, and a control method thereof.

2. Description of the Related Art

Conventionally, apparatuses having a power saving mode have had 2 modes: a normal mode in which the intended normal operations of the apparatus are performed; and a power saving mode in which power consumption is inhibited and normal operations waited upon.

There exist apparatuses for which, when in the power saving mode, in order to reduce power consumption as much as possible, current is only passed to a part which detects a trigger for returning from the power saving mode to the normal mode, and power supply to the rest of the parts is stopped.

On the other hand, to reflect the rise in calls for power consumption reduction with a power saving mode, a power switch is provided on the side of a commercial power supply input (hereinafter referred to as "the AC side"), and when power supply to the parts other than the part which detects the trigger for returning from the power saving mode to the normal mode is stopped, the AC side is disconnected from the parts by this power switch being turned off. This is because when, in a state in which the commercial power supply (AC side) is connected to a power supply unit, when the power supply to the apparatus is disconnected, power is consumed within the power supply unit. A mechanical relay which is low cost and can handle a large current is used as the switch for disconnecting the power supply on the AC side in this way. However, for this kind of mechanical relay, a mechanical life and an electrical life are set, and power supply control apparatuses, which perform control processing so not to turn off (disconnect) the mechanical relay for a set period of time in order to satisfy these lifetimes, have been proposed. (refer to Japanese Patent Laid-Open No. 2009-15649).

In the power supply control apparatus disclosed in Japanese Patent Laid-Open No. 2009-15649, even in the case where the power saving mode is returned to in order to process a status query packet from, for example, an management server, it is necessary to keep the mechanical relay (the connection to the AC side) on for a specific period of time. Also, even in the case where a job such as one that doesn't include printing (for example, referencing data that was saved in the power supply control apparatus) is executed, it is necessary to keep the mechanical relay ON for a specific period of time. However, because of, for example, the fact that power savings in the aforementioned part that detects the trigger have improved, power consumption due to the maintaining of the "ON" state of the mechanical relay has become a problem.

Also, in order to improve power savings in cases such as when the state of the device is queried and when a job that doesn't include printing is executed, it is possible to consider methods of passing current to a LAN controller and a CPU without turning on the mechanical relay. However, in order to do this it is necessary to increase the rated output capacity of the power supply unit that operates during the power saving mode. A problem existed that if the rated output capacity of the power supply unit is increased, because the power conversion efficiency is degraded when only low power relative to the rated output capacity is used, the power usage on the AC side increases in the power saving mode in which current is only passed to the trigger detection part.

SUMMARY OF THE INVENTION

An aspect of the present invention is to eliminate the above-mentioned problems with the conventional technology.

A feature of the present invention is to provide a power supply control apparatus, and a control method thereof, which makes possible the reduction of power usage for processing on the whole.

According to an aspect of the present invention, there is provided a power supply control apparatus comprising: a receiving unit configured to receive data sent from an external device via a network; a control unit configured to process the data received by the receiving unit; a first power supply unit configured to supply power to the receiving unit and to the control unit; a second power supply unit configured to supply power to the control unit; a switching unit configured to switch between supply and disconnection of power from the first power supply unit to the control unit; a mechanical switch configured to switch between supply and disconnection of power from the second power supply unit to the control unit; a power supply control unit configured to, in a case where the receiving unit received the data from the external device in a power state in which power is supplied from the first power supply unit to the receiving unit and power to the control unit is stopped, control the switching unit so that power is supplied from the first power supply unit to the control unit without turning on the mechanical switch.

According to another aspect of the present invention, there is provided a method for controlling a power supply control apparatus, the method comprising: a step of receiving data sent from an external device via a network; a step of supplying power from a first power supply unit, that supplies power to a receiving unit, to a control unit, that processes the data, in a case where the receiving unit, having received the data, cannot send a reply to the network in response to the data; a processing step of processing the data with the processing unit which is being supplied power from the first power supply unit; a step of turning on a mechanical switch so that power is supplied to the control unit from the second power supply unit, in a case where the control unit, being supplied power from the first power supply unit, cannot process the data; a step of processing the data with the control unit which, due to the mechanical switch being turned on, is being supplied power from the second power supply unit.

Further features and aspects of the present invention will become apparent from the following description of exemplary embodiments, with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a block diagram illustrating a configuration of a power switcher according to the embodiment of the present invention;

FIG. 4 is a diagram illustrating each operational state of the MFP according to the embodiment of the present invention;

FIG. 7 is a diagram illustrating an example of a breakdown of power supplied from a low power supply unit of the MFP according to an embodiment of the present invention.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

Figure 1:
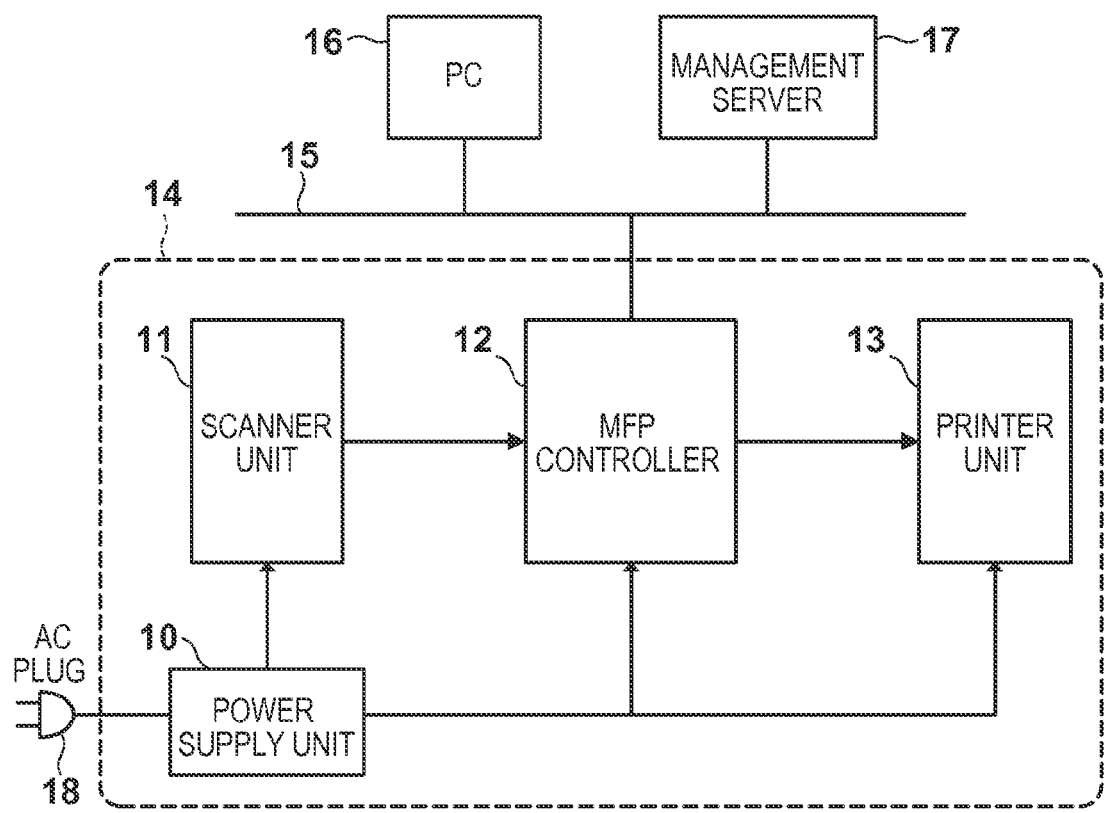
FIG. 1 is a block diagram illustrating the general configuration of a multifunction peripheral (MFP) applicable to a power supply control apparatus according to an embodiment of the present invention.

FIG. 1 is a block diagram illustrating the general configuration of a multifunction peripheral (hereinafter referred to as an MFP) applicable to a power supply control apparatus according to an embodiment of the present invention.

The MFP 14 is connected to a management server 17 and to a PC 16 via a network 15 such as Ethernet (registered trademark). The management server 17 is a server which remotely manages the MFP 14, and regularly performs management information exchange with the MFP 14 over the network 15. The PC 16 has installed on it a printer driver for causing execution of printing on the MFP 14, and it periodically queries the state of the MFP 14.

Next, an explanation of the internal configuration of the MFP 14 is provided.

An MFP controller 12 controls entirely the MFP 14, and also performs control of sending and receiving of packets to and from the network 15. A scanner unit 11 optically reads in a sheet of paper and converts the image on the paper into a digital image. A printer unit 13, performs processing for printing onto a recording medium in sheet form (e.g. a printing sheet) following, for example, an electrophotographic method. Furthermore, when an AC plug 18 is inserted into a commercial power supply outlet, and a power supply unit 10 is thereby supplied with alternating current, the power supply unit 10 supplies direct current to each control unit. According to this kind of configuration, the MFP 14 has such functions as a copy function, a printer function and a scanner function.

Figure 2:
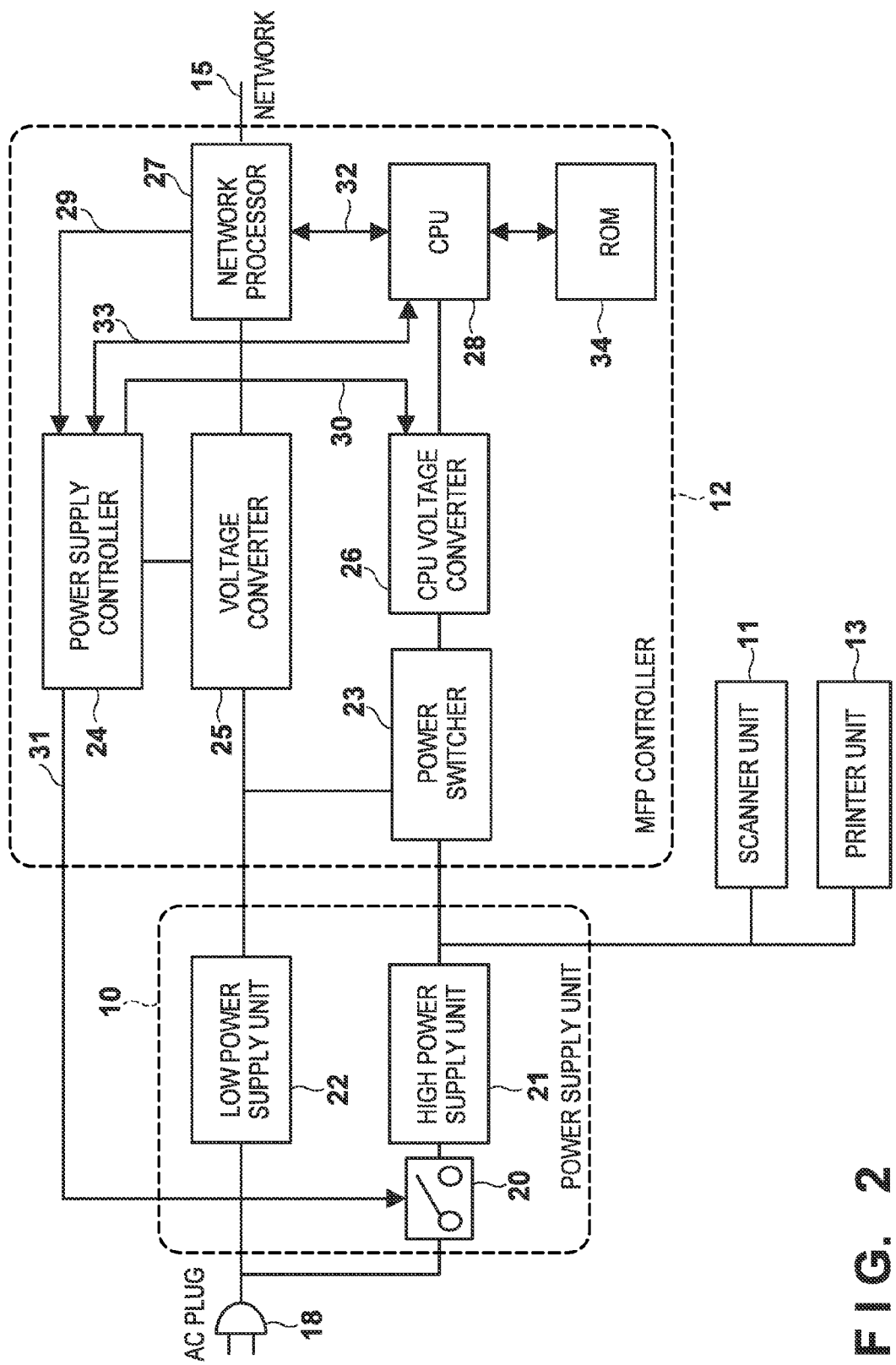
FIG. 2 is a block diagram illustrating the internal configuration of the MFP according to the embodiment of the present invention.

FIG. 2 is a block diagram illustrating the internal configuration of the MFP according to the embodiment of the present invention. Note, in FIG. 2, elements common with FIG. 1 are similarly numbered, and their explanations are abbreviated.

When a low power supply unit 22 is supplied with alternating current commercial power supply via the AC plug 18, it supplies continuous direct current voltage. Note, the low power supply unit 22 is a small capacity power supply unit for which the rated output capacity is kept low so that high efficiency will be achieved under the load of the power saving mode. This makes it possible to lower the power consumption on the AC side in the power saving mode. A high power supply unit 21 supplies large quantities of power to the scanner unit 11, the printer unit 13 and so on. A configuration is taken such that it is possible to disconnect the input from the AC side to this high power supply unit 21 using a mechanical relay 20. Due to this, in the power saving mode, the power consumption of the high power supply unit 21 is zero, because the power supply of a large amount of power to the high power supply unit 21 from the alternating current commercial power supply is disconnected by the mechanical relay 20. The mechanical relay 20 is one that has a mechanical junction, and its operational power consumption can correspond to the 1 kW class. Furthermore, the mechanical relay 20 switches between a connected state ("ON control") and a disconnected state ("OFF control") according to a relay control signal 31 that is supplied from the power supply controller 24. Note, the "connected state" is the state in which the high power supply unit 21 receives power supply from the alternating current commercial power supply via the AC plug 18. Also, the "disconnected state" is the state in which the high power supply unit 21 does not receive power supply from the alternating current commercial power supply via the AC plug 18.

A voltage converter 25, converts the direct current voltage from the low power supply unit 22 to the voltage levels requested by the power supply controller 24 and a network processor 27, and supplies each of them the required voltage. Note, the voltage converter 25 is designed so that power is supplied continuously in order that the power supply controller 24 and a network processor 27 operate even during the power saving mode. A CPU voltage converter 26 converts direct current voltage from the power switcher 23 into a voltage level requested by a CPU 28 (central processing unit) and supplies it to the CPU 28. Furthermore, the CPU voltage converter 26 switches between supplying and stopping power to the CPU 28 according to a control signal 30 received from the power supply controller 24.

When the network processor 27 receives a packet from an external device via the network 15 in the power saving mode, it outputs an interrupt signal 29 to the power supply controller 24. During the normal mode, in which normal operation is carried out, the network processor 27 communicates with the CPU 28 via an internal bus 32 and sends and receives data, and the CPU 28 executes the processing of the network packets. The CPU 28 performs control of the MFP 14 on the whole and it also executes processing of such things as determination of the operational state of the MFP 14 and network packet analysis/response. Note, the CPU 28 is a processor that provides a low power consumption mode in which it is possible to operate in a low power consumption state which is lower than normal. As for this kind of CPU 28, for example, there are known processors which support technology to keep down power consumption by periodically thinning out the operation clock (clock throttling technology). Note, when in the low power consumption mode, because the operation clock of the CPU 28 is set to a lower frequency, the processing capacity is lower than in the normal mode. A ROM 34 stores programs executed by the CPU 28, and when the CPU 28 is supplied with power, the CPU 28 reads a program out of the ROM 34 in order, and it executes processing in accordance with the program.

When the power supply controller 24 receives the interrupt signal 29 from the network processor 27 in the power saving mode, it executes the "ON control" of the mechanical relay 20 and the CPU voltage converter 26 with the relay control signal 31 and the control signal 30. In the normal mode, when the power supply controller 24 receives an instruction to transition to the power saving mode from the CPU 28 via the internal bus 33, it executes the "OFF control" of the mechanical relay 20 and the CPU voltage converter 26 with the relay control signal 31 and the control signal 30. A power switcher 23 supplies power from either the low power supply unit 22 or the high power supply unit 21 to the CPU voltage converter 26 according to the operational state of the MFP 14.

FIG. 3 is a block diagram illustrating a configuration of the power switcher 23 according to the embodiment of the present invention, and elements common with FIG. 2 are similarly numbered. Note, in this embodiment, the direct current voltage values output by the low power supply unit 22 and the high power supply unit 21 are different from each other, and a case in which the voltage value output by the high power supply unit 21 is larger than that output by the low power supply unit 22 is illustrated.

The power switcher 23 is connecting the power source outputs of the low power supply unit 22 and the high power supply unit 21 to the CPU voltage converter 26 via diodes 41, 42. When in the power saving mode or the network response mode or the like, because the power supply to the high power supply unit 21 is turned off, power is supplied from the low power supply unit 22 via the diode 41 to the CPU voltage converter 26. Furthermore, when in the normal mode, because of being in the "ON" state, in which power is supplied from the high power supply unit 21, power is supplied from the high power supply unit 21 via the diode 42 to the CPU voltage converter 26. Note, as previously mentioned, power is supplied from the low power supply unit 22 to the voltage converter 25 continuously.

FIG. 4 is a diagram illustrating each operational state of the MFP 14 according to the embodiment of the present invention.

In the embodiment, the MFP 14 is providing 3 modes: a power saving mode, a network response mode and a normal mode. The power saving mode is a state in which current is passed only to a network packet detection unit for returning to the normal mode, and power supply to all other parts is stopped. This power saving mode is a state in which power is being supplied to the low power supply unit 22, the voltage converter 25, the power supply controller 24 and the network processor 27. Note, the power switcher 23 is supplying power from the low power supply unit 22 to the CPU voltage converter 26 via the diode 41, but because the CPU voltage converter 26 is in a state in which its output is stopped, the CPU 28 is not supplied with power.

The network response mode is a mode in which a network packet addressed to the MFP 14 is detected, and the contents of the network packet is analyzed. Furthermore, in the case where the content of the network packet is not a print job that will use the printer unit 13, processing is executed in this network response mode state. Note, an example of jobs whose processing is executed in the network response mode is give below:
(1) Response to a device status query from the PC 16, the management server 17 or the like
(2) When the image data saved in the MFP 14 is referenced via the network
(3) When setting of the MFP 14 is carried out via the network This network response mode is a state in which power is being supplied to the low power supply unit 22, the power switcher 23, the voltage converter 25, the power supply controller 24, the network processor 27, the CPU voltage converter 26 and the CPU 28. Note, the CPU 28 operates in the low power consumption mode during this network response mode.

The normal mode is a state in which such things as printing are carried out, the mechanical relay 20 is turned on, and power is being supplied to all of the modules.

Figure 5:
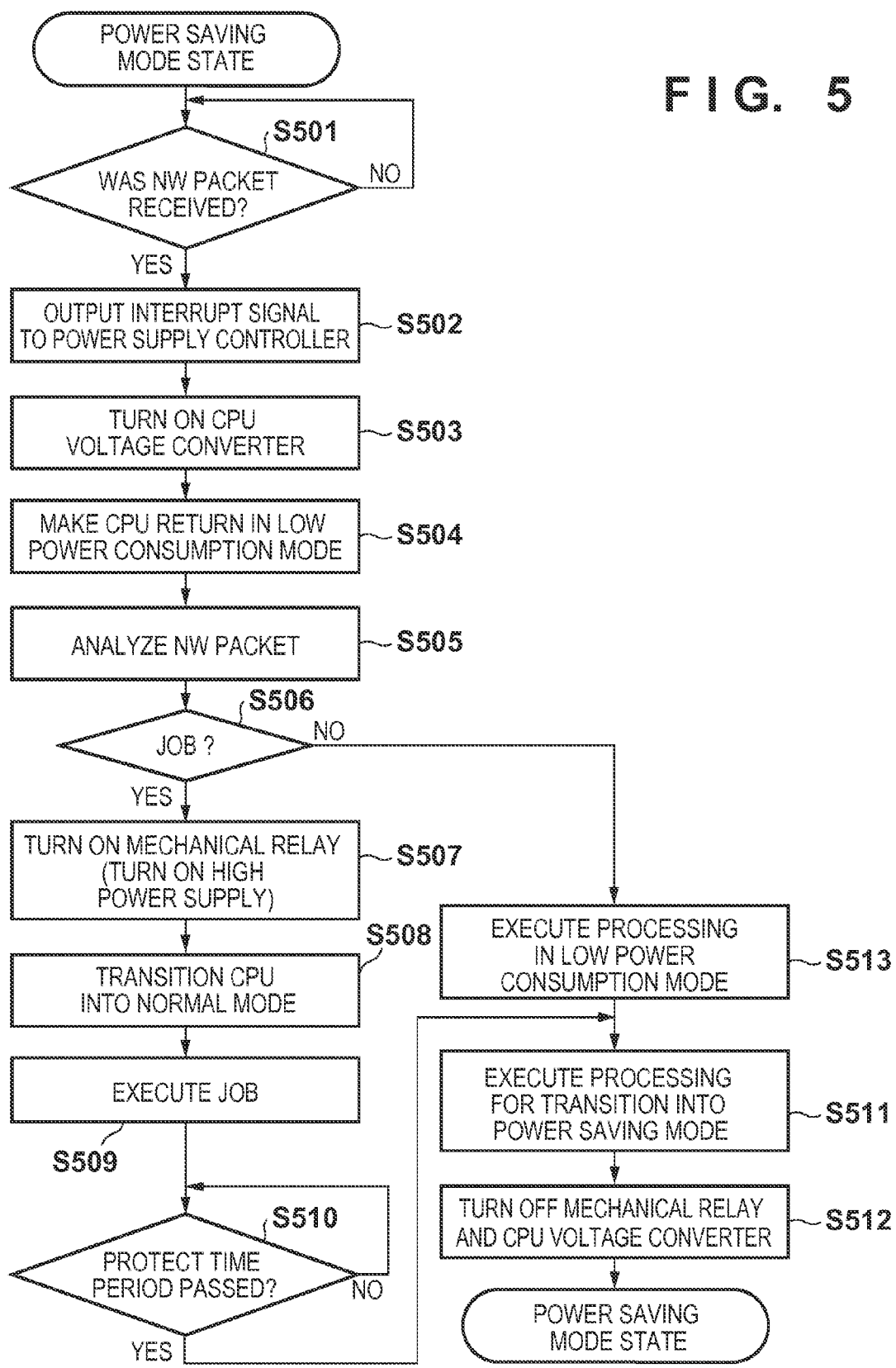
FIG. 5 is a flowchart for describing the processing steps in the MFP when in the power saving mode according to the embodiment of the present invention.

FIG. 5 is a flowchart illustrating the processing steps in the MFP when in the power saving mode according to the embodiment of the present invention.

Firstly, in power saving mode state, in step S501, the network processor 27 monitors to see if a network packet for the MFP 14 has been received or not. In the case where a network packet has been received, the process proceeds to step S502, and the network processor 27 outputs the interrupt signal 29 to the power supply controller 24. The power supply controller 24 thereby receives the interrupt signal 29 and turns on the control signal 30. In step S503, when the control signal 30 is turned on, the CPU voltage converter 26 starts supplying power to the CPU 28. When power supply to the CPU 28 is restarted in this way, the process proceeds to step S504, and the CPU 28 reads out a program from the ROM 34, and the initialization processing of CPU 28 itself is performed. Note, during this initialization processing, the CPU 28 performs a setting so that it operates in the low power consumption mode. After the CPU 28 returns in the low power consumption mode in this way, the process proceeds to step S505, and the CPU 28, performs analysis of the network packet data, via the internal bus 32. Next, the process proceeds to step S506, and the CPU 28 determines, as the result of the analysis, whether or not the network packet data instructs a job that includes printing. When the network packet data does not instruct a job that includes printing, because the network packet data is for example a device status query from the management server 17, the PC 16 or the like, the process proceeds to step S513, and the CPU 28 executes the processing in the low power mode, and the process proceeds to step S511.

Conversely, when it is determined that the network packet data instructs a job that does include printing, the process proceeds to step S507, and the CPU 28 instructs the power supply controller 24 to turn on the mechanical relay 20 via the internal bus 33, in order to turn on the high power supply unit 21. When the power supply controller 24 receives the instruction from the CPU 28, the power supply controller 24 controls the mechanical relay 20 into a connected state ("ON" state) via the relay control signal 31. When the mechanical relay 20 enters the connected state, power is supplied to the high power supply unit 21 which then activates, and the power supply source of the power switcher 23 is changed to be the high power supply unit 21, which thereby supplies power to the CPU voltage converter 26. When the power supply source of the CPU voltage converter 26 is changed to be the high power supply unit 21 in this way, in step S508, setting is performed on the CPU 28 itself so that it operates in the normal mode. After that, the process proceeds to step S509, and the CPU 28 executes such job processing as print requests and the like.

After the completion of the job, the process proceeds to step S510, and it is determined whether or not a protect time period of the mechanical relay 20 has passed. As for this protect time period, it is sufficient to determine the period such that the life of the mechanical relay 20 (number of times it is turned on/off) is not less than that of the product itself. In step S510, in the case where it is determined that the protect time period has passed, the process proceeds to step S511, and the CPU 28 executes processing to transition to the power saving mode. After completion of the processing of the transition into the power saving mode, the process proceeds to step S512, and the CPU 28 instructs the power supply controller 24 to turn off the mechanical relay 20 and the CPU voltage converter 26 via the internal bus 33. When the power supply controller 24 receives the instruction from the CPU 28, the power supply controller 24 controls the mechanical relay 20 into a disconnected state ("OFF" state) via the relay control signal 31, and the power supply controller 24 controls the CPU voltage converter 26, via the control signal 30, into a state in which output is stopped. In this way power saving mode is transitioned into.

As previously explained, in this embodiment, in the power saving mode, device status queries and jobs that don't include printing and the like are executed with the mechanical relay left turned off. Also, in the power saving mode state, when a job that must execute in the normal mode, such as a print job, is received, the mechanical relay 20 is turned on and the job is executed. Next, when the execution of the job finishes, the elapsing of the protect time period of the mechanical relay 20, which is chosen considering the life of the mechanical relay 20 in relation to that of the product itself, is waited upon and then the mechanical relay 20 is turned off. This makes it possible to perform power saving control while considering the life of the mechanical relay.

Figure 6:
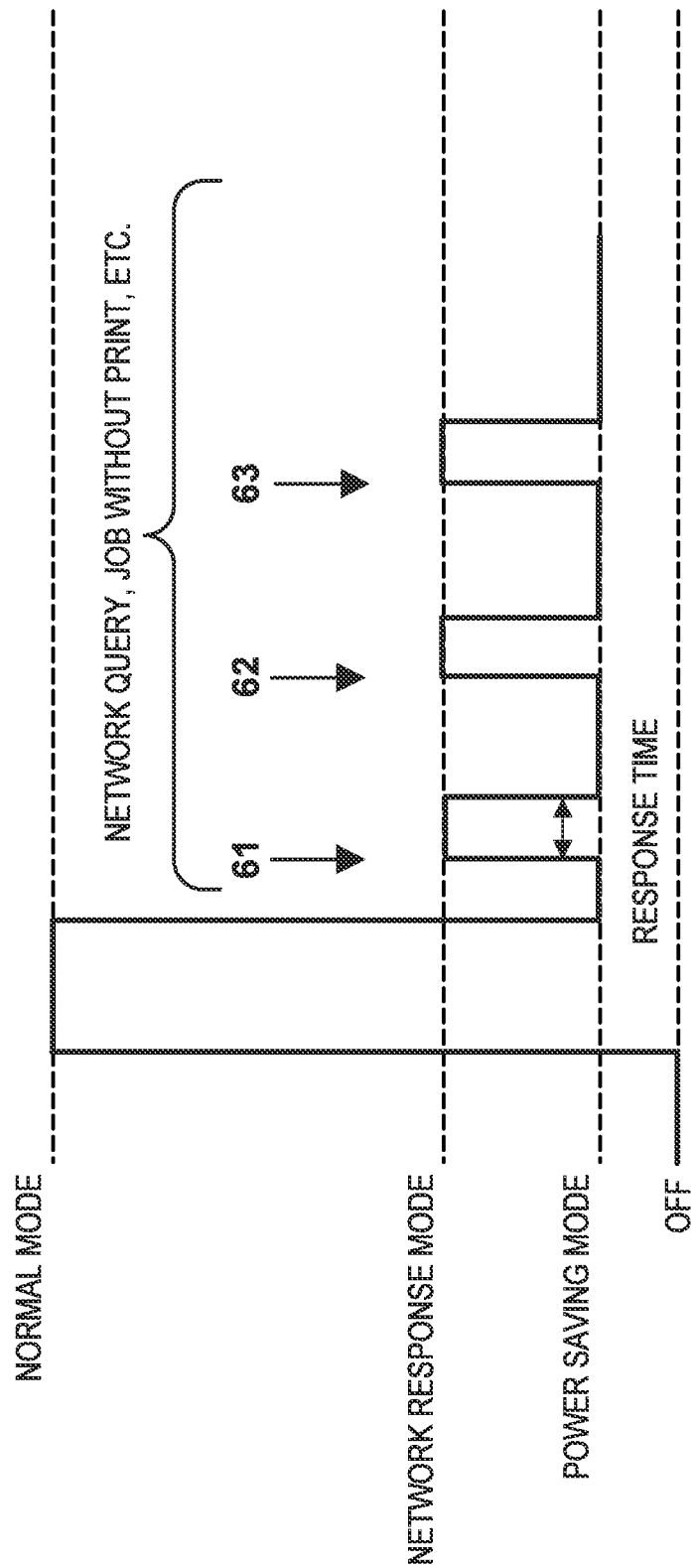
FIG. 6 is a diagram illustrating an example of a control sequence according to the processing steps in FIG. 5.

FIG. 6 is a diagram illustrating an example of a control sequence according to the processing steps in FIG. 5.

For device status queries and jobs that don't include printing (61, 62, 63), the CPU 28 is made to operate in the low power consumption mode in order to keep the power consumption within the rated output capacity of the low power supply unit 22. Due to this, it becomes possible for processing to be done with the mechanical relay left in the "OFF" state.

FIG. 7 is a diagram illustrating an example of a breakdown of power supplied from a low power supply unit of the MFP according to the embodiment of the present invention.

In this embodiment, because the rated output capacity of the low power supply unit 22 is 8 W, it is necessary to keep within this rated output capacity (no greater than 8 W) under all conditions. First, in the power saving mode, power is only supplied to the network processor 27 and to the power supply controller 24, and the total amount of power is on the order of 0.8 W. Next, in the network response mode, power is supplied to the network processor 27, to the power supply controller 24 and to the CPU 28. Here, if the CPU 28 were to be made to operate in the normal mode state, the power consumption would be on the order of 10 W and the rated output capacity of the low power supply unit 22 would be exceeded.

So, in this embodiment, when in the network response mode, by making the CPU 28 operate in the lower power consumption mode state (power consumption on the order of 5 W), the power consumption is kept within the rated output capacity of the low power supply unit 22, and the "ON control" of mechanical relay 20 is not performed. Therefore, in the network response mode, the total amount of power is on the order of 5.8 W. Next, in the normal mode, by putting the mechanical relay 20 into the "ON" state and supplying power from the high power supply unit 21 to the CPU 28 and the like, the rated output capacity of the low power supply unit 22 is not exceeded. Note, in FIG. 7, in the normal mode, the reason that the total amount of power that the low power supply unit 22 outputs is 0.8 W is that, in the normal mode, the CPU 28 operates being supplied power by the high power supply unit 21.

Note, when the CPU 28 is made to operate in the low power consumption mode, even though the processing capability of CPU 28 decreases, because device status queries, jobs that do not include printing and the like do not require so much processing capability, it is not a problem to be made to operate in the low power consumption mode.

When device status queries, jobs that do not include printing and the like are executed, it is possible to control so that the mechanical switch (relay switch) which has a lifetime constraint is not turned on/off. Therefore, after the device status query, the job that does not include printing or the like finishes, it is possible to transition immediately to the power saving mode. Because of this, the effect is that it is possible to realize a reduction in overall power consumption including even when a job that does not include printing is executed.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-031041, filed Feb. 15, 2012, which is hereby incorporated by reference herein in its entirety.

What is claimed is:

1. A power supply control apparatus comprising:
a receiving unit configured to receive data sent from an external device via a network;
a control unit configured to process the data received by the receiving unit;
a first power supply unit configured to supply power to the receiving unit and to the control unit;
a second power supply unit configured to supply power to the control unit, wherein a voltage supplied by the second power supply unit is a higher voltage than a voltage supplied by the first power supply unit;
a switching unit configured to switch between supply and disconnection of power from the first power supply unit to the control unit;
a mechanical switch configured to switch between supply and disconnection of power from the second power supply unit to the control unit; and
a power supply control unit configured to, in a case where the receiving unit received the data from the external device in a power state in which power is supplied from the first power supply unit to the receiving unit and power to the control unit is stopped, control the switching unit so that power is supplied from the first power supply unit to the control unit without turning on the mechanical switch, and further control to turn on the mechanical switch if the control unit has determined that a power supply from the second power unit is necessary for processing the data.

2. The power supply control apparatus according to claim 1, wherein, in a case where power is supplied from the first power supply unit to the control unit without the mechanical switch being turning on, an operation clock of the control unit has a lower frequency than the operation clock of the control unit in a case where the mechanical switch is turned on and power is supplied from the second power supply unit to the control unit.

3. The power supply control apparatus according to claim 1, wherein the control unit, being supplied power from the first power supply unit, analyzes the data received from the receiving unit and determines whether to turn on the mechanical switch, and the power supply control unit controls whether to turn on the mechanical switch based on the result of the determination by the control unit.

4. The power supply control apparatus according to claim 3, wherein the control unit determines whether to turn on the mechanical switch based on the type of data received by the receiving unit.

5. The power supply control apparatus according to claim 4, wherein the control unit determines whether the data received by the receiving unit corresponds to a job that includes printing, and in a case where the data corresponds to a job that includes printing, the power source control unit turns on the mechanical switch, and in a case where the data corresponds a job that does not include printing, the power source control unit does not turn on the mechanical switch.

6. The power supply control apparatus according to claim 1, further comprising:
 a voltage conversion unit configured to adjust a voltage, supplied to the control unit, between the switching unit and the control unit.

7. The power supply control apparatus according to claim 1, wherein the power supply control unit, after the mechanical switch has been turned on, does not turn off the mechanical switch until a specific period of time has passed, and
 the specific period of time for the mechanical switch is chosen considering a life of the mechanical switch.

8. The power supply control apparatus according to claim 1, wherein the control unit, being supplied power from the first power supply unit, processes the data received by the receiving unit.

9. The power supply control apparatus according to claim 1, wherein after the control unit has processed the data, the power supply control unit controls the switching unit so that power supply from the first power supply unit to the control unit is disconnected.

10. A method for controlling a power supply control apparatus comprising a receiving unit configured to receive data sent from an external device via a network, a first power supply unit configured to supply power to the receiving unit and to the control unit, a second power supply unit configured to supply power to the control unit, wherein a voltage supplied by the second power supply unit is a higher voltage than a voltage supplied by the first power supply unit, and a mechanical switch configured to switch between supply and disconnection of power from the second power supply unit to the control unit, the method comprising:

processing the data received by the receiving unit;

switching between supply and disconnection of power from the first power supply unit to the control unit; and in a case where the receiving unit received the data from the external device in a power state in which power is supplied from the first power supply unit to the receiving unit and power to the control unit is stopped, control the switching unit so that power is supplied from the first power supply unit to the control unit without turning on the mechanical switch, and further control to turn on the mechanical switch if the control unit has determined that a power supply from the second power unit is necessary for processing the data.

* * * * *